April 24, 1962 B. J. SHAW 3,030,645
PORTABLE RAMP FOR WHEEL CHAIRS
Filed Feb. 6, 1958 3 Sheets-Sheet 1
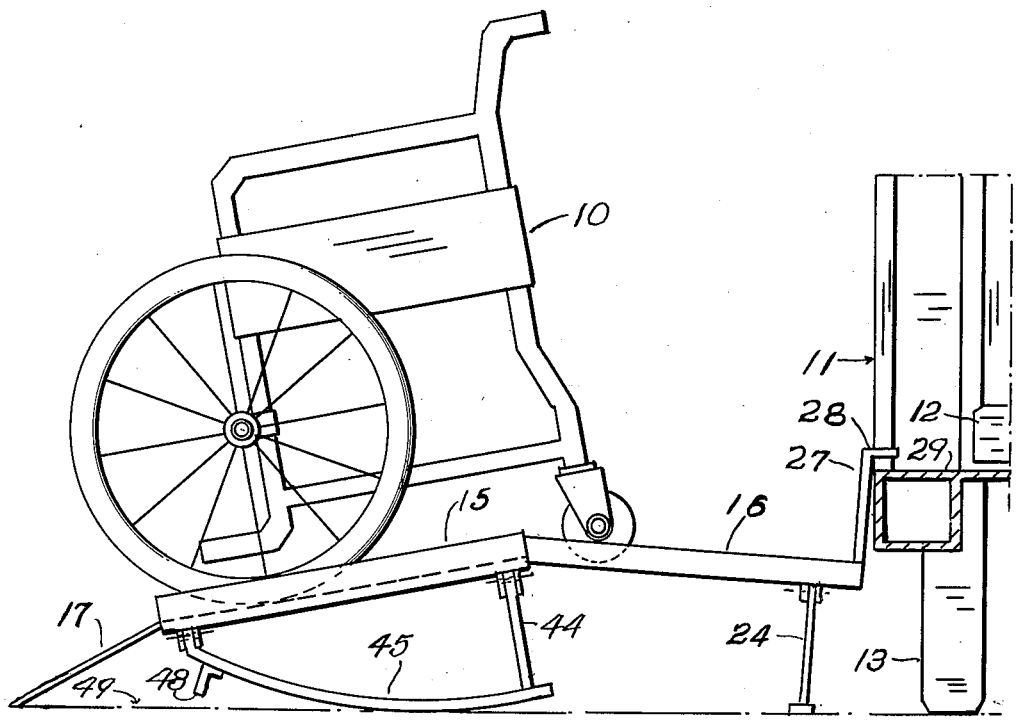
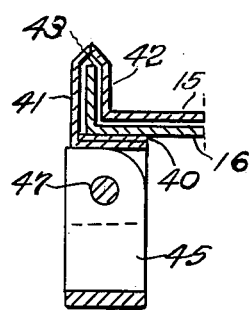
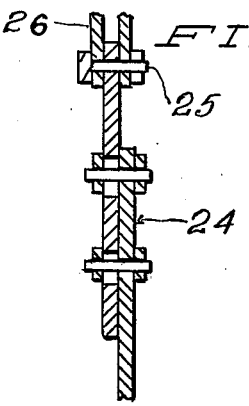
BERT J. SHAW
BY Charles A. Lind
ATTORNEY April 24, 1962
B. J. SHAW
3,030,645
PORTABLE RAMP FOR WHEEL CHAIRS
Filed Feb. 6, 1958
3 Sheets-Sheet 2
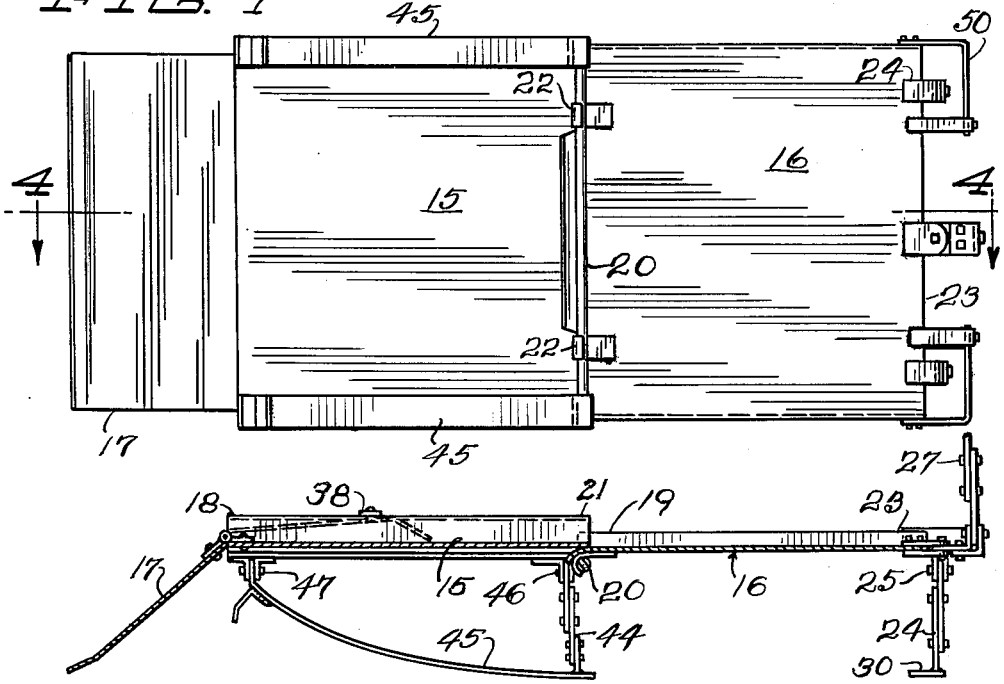
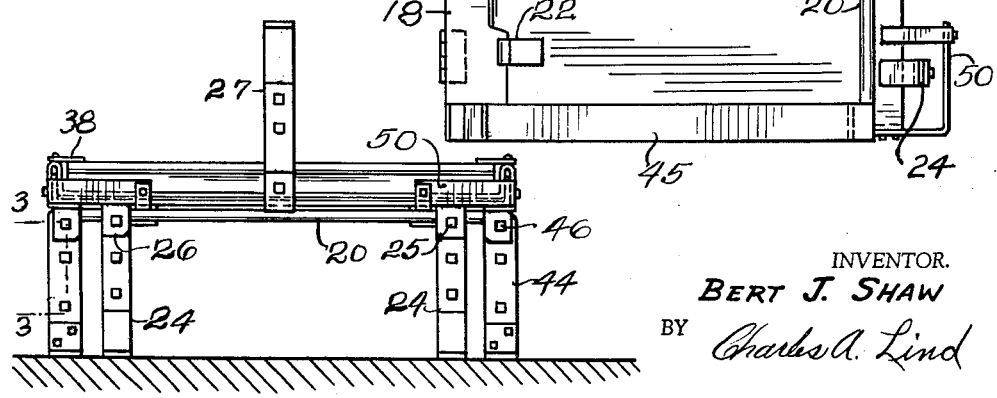
INVENTOR.
BERT J. SHAW
BY Charles A. Lind
ATTORNEY

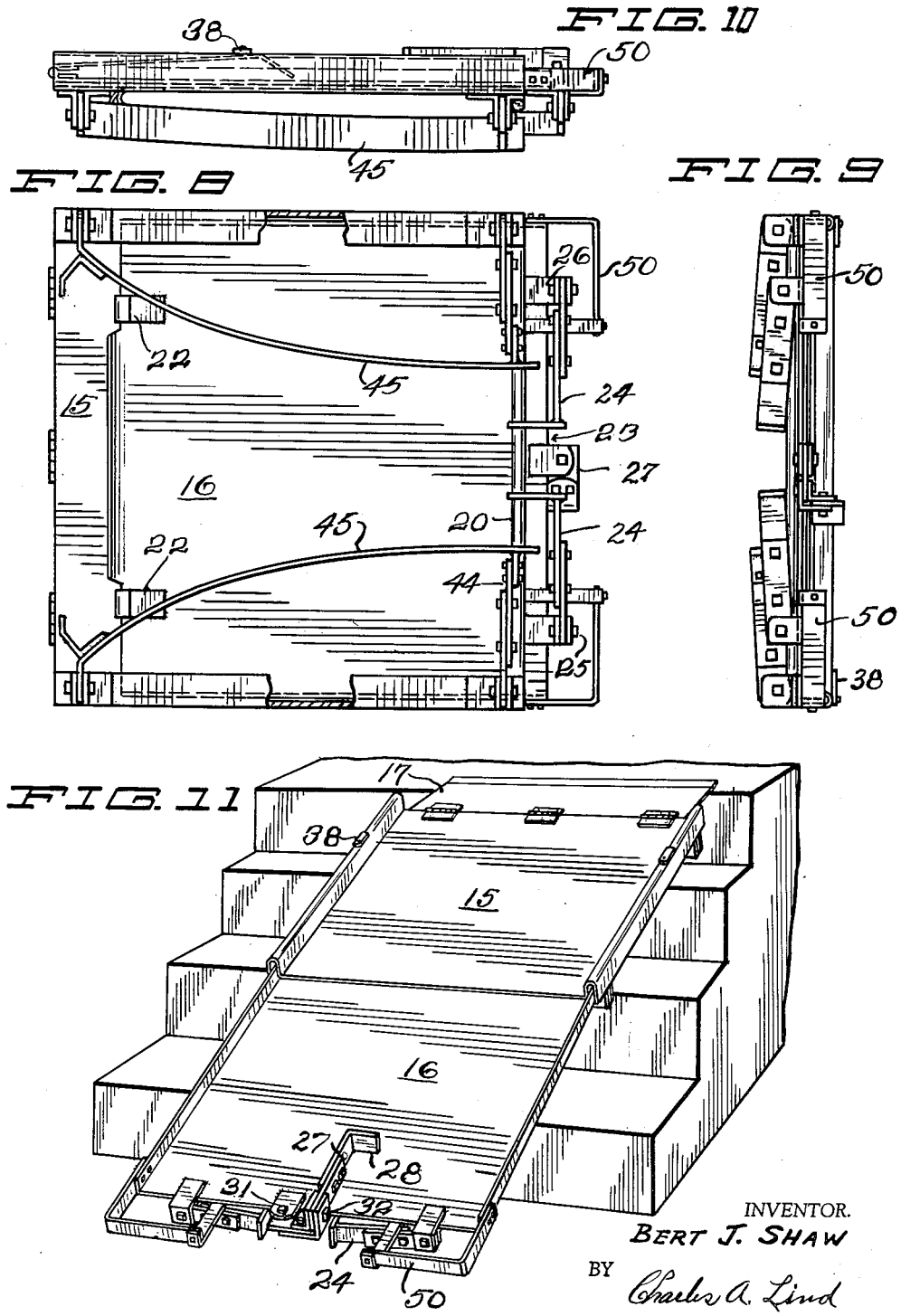

United States Patent Office 3,030,645
Patented Apr. 24, 1962

3,030,645
PORTABLE RAMP FOR WHEEL CHAIRS
Bert J. Shaw, Brainerd, Minn., assignor to Shaw's Travel Tric, Inc., Brainerd, Minn., a corporation of Minnesota
Filed Feb. 6, 1958, Ser. No. 713,671
3 Claims. (Cl. 14—72)

The present invention relates to an improved ramp for wheel chairs and has as its object to provide a ramp which shall be particularly well adapted for use in transfering a wheel chair with a person in it from one level to another, as from street level to an adjacent passenger automobile, and which shall also be particularly well adapted to be compacted after use to provide an assembly which may be readily carried by hand.

For a consideration of what I consider to be novel and my invention, attention is directed to the following specification and the claims appended thereto.

In the drawings forming part of this specification,

FIG. 1 is a side elevation of a ramp embodying the present invention, the view showing one end of the ramp positioned adjacent the open doorway of a passenger automobile and also showing a wheel chair on the ramp;

FIG. 2 is a vertical section on line 2—2 of FIG. 5;

FIG. 3 is a vertical section taken on line 3—3 of FIG. 6;

FIG. 4 is a vertical section on line 4—4 on FIG. 7;

FIG. 5 is a bottom plan view of the ramp showing how parts may be arranged when the ramp is not in use;

FIG. 6 is an end elevation of the ramp as viewed from the right of FIG. 4;

FIG. 7 is a bottom plan view of the ramp;

FIG. 8 is a bottom plan view of the ramp in knockdown position;

FIG. 9 is an end elevation of the ramp in a knockdown position;

FIG. 10 is a side elevation of the ramp in a knockdown position; and

FIG. 11 shows how certain parts of the ramp may be disposed over a series of steps to serve as an ordinary inclined plane thereon.

In the drawings, a conventional wheel chair is indicated at 10; a portion of a doorway of a passenger automobile at 11; a seat in the automobile at 12 and one wheel of the automobile at 13.

The improved ramp is comprised of a first platform 15 supported on curved rocker members 45 in such a way that the rear ends of said rocker members are substantially more remote in a downward direction from the rear end of said platform than the front end of said members are remote in a downward front end of the platform whereby the platform is normally inclined in a downward direction toward its front end to receive the wheel chair 10 to be elevated, and whereby the said rockers do not tend to rock the first platform substantially beyond horizontal position; and the ramp is further comprised of a second platform 16 whose front end is mounted on the rear end of said first platform to receive the elevated wheel chair and whose rear end is maintained at the desired elevation by longitudinally adjustable legs 24 to suit the convenience of the occupant of the wheel chair leaving the wheel chair and entering an automobile. To permit the ramp to be made into a compact package for portable and storage purposes the invention provides a unique combination of element as will become apparent as the description proceeds. To facilitate description the front end of the first platform 15 is indicated by reference numeral 18 and its rear end by reference numeral 21; and the front end of the second platform 16 is indicated by reference numeral 19 and its rear end by reference numeral 23.

The means which interconnects the two platforms 15 and 16 in and to end relation comprises a cross bar 20 which is fixedly secured to the underside of said first platform 15 at the rear end 21 thereof at a level a short distance below the underside of said first platform 15 to provide ample clearance between said rod and said first platform to permit entry of the second platform 16 to slide front end first below the first platform 15 for support thereby when the ramp is not in use. Said means also comprises a pair of laterally spaced hook-shape brackets 22 affixed to the underside of the second platform 16 for hooking over the cross bar 20 at the front side thereof to prevent separation or uncoupling of the two platforms when the ramp is in use.

At the rear end 23 of the second platform 16 there are two depending and laterally spaced supporting legs 24 each secured to said platform by means comprising a hinge pin 25 (see FIGS. 4 and 8) carried by a bracket 26 secured to the underside of said platform. The hinge pin 25 is provided so that when the ramp is not in use the two legs 24 can be swung toward each other to facilitate handling of the ramp (see FIG. 8). The legs may be longitudinally adjustable and may be held against turning movement by clamping friction at the hinge pins or by any other preferred means.

An upstanding arm 27 mounted on the rear end 23 of the second platform 16 has a forwardly extending portion 28 adapted normally to overlie the floor 29 of an automobile in spaced relation but adapted to contact said floor in the event the feet 30 of said legs sink into soft ground. Said arm 27 is secured to said platform by a compound joint comprising two hinge pins 31 and 32 at right angles to each other so that said arm can be positioned out of the way when ramp is not in use (see FIG. 11). Friction means at the hinge pins may be utilized to lock the arm in upright position during use.

The means for supporting the second platform 16 below the first platform 15 when the ramp is to be compacted comprises two laterally spaced ledges 40, one at each lateral side of the first platform, these ledges being in longitudinal alinement with the top side of the cross bar 20 hereinbefore referred to so that the second platform 16 may be readily pushed onto said ledges for support thereon below the first platform as will now be readily understood. As best shown in FIG. 2, each ledge 40 is preferably formed by a lateral shelf at the lower edge of a longitudinally extending upright wall 41 whose upper edge is fixedly secured, as by welding, to the upper edge of an upright flange 42 at each lateral side of the platform 15, the two flanges 42 serving as wheel curbs on said first platform. The second platform 16 also has upstanding longitudinally extending flanges 43 which form wheel curbs thereon. Each aforesaid wall 41 is laterally spaced outwardly from the adjacent curb flange 42 on the first platform 15 whereby there is formed at each side of the curb flange a guide channel for the respective curb flanges 43 on the second platform 16 when the latter is moved into place below the first platform as will now be readily understood.

The rocker members 45 are hingedly connected to the first platform so that they may be swung inwardly against the underside of the second platform 16 when the latter is arranged below the first platform 15, the hinges being indicated at 46 and 47. As previously stated, the rear terminal ends of the rocker members 45 are substantially more remote from the first platform 15 in a downward direction than the front terminal and are remote from the front end of said platform, and this arrangement is effected by a longitudinally adjustable post 44 interposed between the rear end of each rocker member and the rear hinge 46, the lower end of the post being fixedly secured to the rocker member and its upper end being connected to the rear hinge 46. When said rocker members 45 are disposed against the underside of the second platform as already described, the previously mentioned brackets 22 on the second platform 16 are in a position between said rocker members near the front ends of the latter (see FIG. 8) whereby the inwardly extending curvature of said rocker members prevents the withdrawal of the second platform from below the first platform as will be readily understood by reference to said FIG. 8. Hand holds at the rear end of second platform 16 for carrying the compacted ramp are indicated at 50. Friction means will usually be associated with said hinges 46 and 47 to prevent undesired swinging movement of said rocker members; and in addition outward swinging movement thereof from upright position is prevented by the barrier comprising the under surface of the ledges 40 and the adjacent flat parts at the upper end of the rocker elements, as will be readily understood by reference to FIG. 2 of the drawings.

Hinged to the front end of the first platform is an approach plate 17 which is adapted to be swung back upon the platform 15 and held thereon by latch means 38 when the ramp is to be made into a compact package.

From the foregoing description it is believed to be clear that the improved ramp is particularly well adapted for moving a wheel chair with a person therein from, say, street level to the floor level of a passenger automobile and since the improved ramp may also be compacted in the manner shown and described it follows that the ramp has the great practical advantage of easy handling when not in use.

What I claim is:

1. In a ramp for wheel chairs, the combination of a first platform and a pair of curved rocker members for rockably supporting said platform on a supporting surface, said platform and said rocker members each having front and rear ends, a plate hinged to the front end of said platform to facilitate the transfer of a wheel chair from said supporting surface to said platform and from the latter to said supporting surface, means hingedly connecting the front ends of said rocker members to the underside of said platform at the front end thereof at points in relatively close proximity to the side edges of said platform, a pair of elongated spacer posts each having upper and lower ends of which the lower ends are mounted on the rear ends of said rocker members to extend upwardly therefrom, side walls secured to and depending from the sides of said first platform to a point below the underside of said first platform, an inwardly extending ledge secured to the lower portion of each of said side walls, means hingedly connecting the upper ends of said spacer posts to the underside of said ledges at the rear ends thereof, the rear ends of said rocker members when said spacer posts are in a position perpendicular to said first platform being substantially more distant from the underside of said first platform than the front ends of said rocker members are distant from the same, said hinge means at the front ends of said rocker members together with said hinge means at the upper ends of said spacer posts permitting said rocker members to be swung inwardly towards each other when the ramp is not in use from a position where said spacer posts are perpendicular to said first platform to a position where said rocker members are in folded position with their base sides facing each other in laterally spaced relation, a cross bar spaced from said first platform and secured at its ends to the underside of said ledges at the rear ends thereof adjacent said hinge means, a second platform having front and rear ends the front end of which is normally pivotally supported on said cross bar to extend rearwardly therefrom to form with said first platform an extended pathway for a wheel chair when said ramp is in use and being retractable from said extended position onto said ledges for support thereby when said ramp is not in use, a pair of brackets secured to the underside of said second platform at the front end thereof at points intermediate said ledges and depending therefrom to a point below said cross bar in advance of the latter and abutting the latter to prevent rearward displacement of said second platform when its front end is supported on said cross bar as aforesaid, said brackets at the front end of said second platform extending between the facing base sides of said folded rocker members and abutting the same at points in relatively close proximity to the front ends of said rocker members when said second platform is in its retracted position whereby withdrawal of said second platform from its retracted position is prevented by said folded rocker members by virtue of the rearwardly extending curvature of said folded rocker members toward each other from said last named points, and means maintaining said spacer posts perpendicular to said first platform when said ramp is in use.

2. In a ramp for wheel chairs, a first platform for supporting a wheel chair and having front and rear ends, a pair of laterally spaced curved rocker members normally underlying said platform in upright position for rockably supporting said platform when said ramp is in use and having front and rear ends, means hingedly connecting the front end of each of said rocker members to the front end of said platform at a point in a plane below and parallel to the underside of said platform, a spacer post mounted on and extending upwardly from the rear end of each of said rocker members, means hingedly connecting the upper end of each of said spacer posts to the rear end of said platform at a point in a plane coincident with the aforesaid plane, side walls secured to and depending from the sides of said platform to a point intermediate the underside of the latter and the aforesaid planes, an inwardly extending ledge secured to the lower portion of each of said side walls, said rocker members being swingable on the aforesaid hinge means into folded position below said ledges when said ramp is not in use, a cross bar at the rear end of said platform at a level substantially the same as that of said ledges and bridging the space between said ledges at the rear ends thereof, a second platform normally extending rearwardly from the rear end of said first platform to serve as an extension thereof when said ramp is in use and which when said ramp is not in use being retractable onto said ledges for support thereby, a freely movable hinged incline at the front end of said first platform for facilitating movement of a wheel chair upwardly onto and downwardly from said first platform when said ramp is in use, and means maintaining said rocker members in upright position when said ramp is in use.

3. In a ramp according to claim 2, a pair of brackets secured to and depending from the underside of said second platform at the front end thereof in such laterally spaced relation that the distance between them is less than the distance between said ledges to permit said brackets to project downwardly between said ledges, the lower portion of said brackets when said rocker members are in folded position as aforesaid and when said second platform is supported on said ledges as aforesaid being contiguous to the adjacent base sides of said rocker members whereby the contiguity of said brackets to the base sides of said rocker members as aforesaid and the rearwardly decreasing distance between the base sides of said rocker members toward the rear end of said first platform prevent rearward displacement of said second platform when said ramp is not in use.

References Cited in the file of this patent

UNITED STATES PATENTS

| | | |
|---|---|---|
| 502,568 | Kuckartz | Aug. 1, 1893 |
| 595,643 | Mohler et al. | Dec. 14, 1897 |
| 782,165 | McElvain | Feb. 7, 1905 |
| 963,918 | Miller | July 12, 1910 |
| 1,109,717 | Van Dusen | Sept. 8, 1914 |
| 1,362,716 | McKeen | Dec. 21, 1920 |
| 1,566,427 | Reneau | Dec. 22, 1925 |
| 1,569,469 | Elzey | Jan. 12, 1926 |

FOREIGN PATENTS

| | | |
|---|---|---|
| 746,531 | Great Britain | Mar. 14, 1956 |